United States Patent
Shen (10) Patent No.: US 10,926,741 B2
(45) Date of Patent: Feb. 23, 2021

(54) WIPER BRACKET AND WIPER

(71) Applicant: XIAMEN FLATECH AUTO PARTS CO., LTD., Xiamen (CN)

(72) Inventor: Qinghuai Shen, Xiamen (CN)

(\*) Notice: Subject to any disclaimer, the term of this patent is extended or adjusted under 35 U.S.C. 154(b) by 178 days.

(21) Appl. No.: 16/139,605

(22) Filed: Sep. 24, 2018

(65) Prior Publication Data

US 2019/0092284 A1   Mar. 28, 2019

(30) Foreign Application Priority Data

Sep. 22, 2017 (CN) .......................... 201710866691.7

(51) Int. Cl.
*B60S 1/38* (2006.01)
*B60S 1/40* (2006.01)

(52) U.S. Cl.
CPC ............ *B60S 1/3801* (2013.01); *B60S 1/40* (2013.01); *B60S 2001/3813* (2013.01); *B60S 2001/3815* (2013.01); *B60S 2001/4035* (2013.01)

(58) Field of Classification Search
CPC .. B60S 1/38; B60S 1/3801; B60S 2001/3813; B60S 2001/3815; B60S 2001/4035; B60S 1/40

USPC ............ 15/250.361, 250.44, 250.47, 250.46
See application file for complete search history.

(56) References Cited

U.S. PATENT DOCUMENTS

| 2,888,702 | A | * | 6/1959 | Sussex | .................. B60S 1/3801 15/250.47 |
| 3,348,257 | A | * | 10/1967 | Hadekel | ................ B60S 1/3801 15/250.47 |
| 3,879,793 | A | * | 4/1975 | Schlegel | ............... B60S 1/3806 15/250.201 |
| 4,127,912 | A | * | 12/1978 | Deibel | .................. B60S 1/3801 15/250.47 |

\* cited by examiner

*Primary Examiner* — Gary K. Graham
(74) *Attorney, Agent, or Firm* — Bayramoglu Law Offices LLC (57) ABSTRACT

The invention discloses a wiper bracket and a wiper. The wiper bracket comprises a main bracket, at least one first sub-bracket and a connecting device. The connecting device contains a baffle located at the bottom of the first sub-bracket and the main bracket, with one end fixed at the main bracket or the first sub-bracket, and the other end being a free end. The free end is located on the bracket opposite to the fixed end of the baffle. A side of the first sub-bracket is pivotally connected to the main bracket by a pivotal shaft. A spring is disposed between the main bracket and the first sub-bracket, and located at an upper portion of the baffle. The compression resilience of the spring applies downwardly curved preload to the first sub-bracket.

14 Claims, 6 Drawing Sheets

WIPER BRACKET AND WIPER

CROSS-REFERENCE TO RELATED APPLICATIONS

This application is claims priority to Chinese Patent Application No. 201710866691.7 with a filing date of Sep. 22, 2017. The content of the aforementioned application, including any intervening amendments thereto, is incorporated herein by reference.

TECHNICAL FIELD

The invention relates to a wiper bracket and a wiper thereof.

BACKGROUND

An early wiper is generally a bone wiper, consisting of a main bracket and several sub-brackets pivotally connected to each other with a wiper strip fixed at the bottom end of the sub-brackets. Due to the different area of the windshield of different vehicle models, the larger the area of the windshield is, the longer the length of the main bracket is, and the more the number of the sub-brackets are, so as to make the wiper strip better fit the windshield. However, the bracket and the sub-brackets with the bone wiper are generally made of metal, and the requirement for manufacturing precision of each pivot joint of the main bracket and the sub-bracket is high. As a result, the manufacturing cost of the bone wiper is relatively high.

Later a boneless wiper is developed, which is not based on the design of the main bracket and the sub-brackets. Instead, the main bracket and the sub-brackets are replaced by a prefabricated spring steel with a certain curvature embedded in the wiper strip or on both sides of the wiper strip, thereby achieving a better fit of the wiper strip to the windshield. However, the prefabricated spring steel will usually suffer from curvature deformation after a period of usage. Consequently, the front and rear portions of the wiper strip can no longer fit perfectly to the windshield. Moreover, the material cost of the spring steel is not cheap either. The inventors have intensively studied the above-mentioned drawbacks in the prior art, and produce the present invention.

SUMMARY

The main objective of the present invention is to provide a wiper bracket that better fits the wiper strip to the windshield.

The secondary objective of the present invention is to provide a wiper using the wiper bracket.

To achieve the above objectives, the resolution in the present invention is described as follows:

A wiper bracket, including the following parts:

A main bracket, the middle portion of the main bracket is provided with a mounting seat for adapting to different types of wiper joints; at least one first sub-bracket, the first sub-bracket is located at the front end or the rear end of the main bracket, and the contact surface of the main bracket and the first sub-bracket contains an arc-shaped guiding surface deflected toward the first sub-bracket from bottom to top; a connecting device, forming a pivotal connection between the first sub-bracket and the main bracket;

Wherein the connecting device includes a baffle, a pivoting shaft and a spring; the baffle is located at the bottom of the first sub-bracket and the bottom of the main bracket, where one end of the baffle is fixed at the bottom of the main bracket or the bottom of the first sub-bracket, and the other end of the baffle is a free end located on the bracket opposite to the fixed end of the baffle, and the baffle is provided with two counterbores respectively located at the left and right sides of the front end of the first bracket in the insertion section, and two through holes corresponding to the two counterbores are respectively formed on the left side and right sides of the inserted section of the second bracket, the pivoting shaft sequentially passes through the two through holes and the two counterbores, here if the first bracket is the main bracket, the second bracket is the first sub-bracket, and vice versa;

The spring is disposed between the main bracket and the first sub-bracket, and located at an upper portion of the baffle, and the spring is in a compressed state, while the compression resilience of the spring applies a downwardly curved preload to the first sub-bracket along the arc-shaped guiding surface formed between the main bracket and the first sub-bracket.

In addition, the first sub-bracket is further extended with the second sub-bracket, the second sub-bracket is further extended with the third sub-bracket . . . the (N−1)-th sub-bracket is further extended with the N-th sub-bracket, N≥2, between the first sub-bracket and the second sub-bracket . . . between the (N−1)-th sub-bracket and the N-th sub-bracket are pivotally connected by the connecting device as above, and the contact surface between the two adjacent sub-brackets contains the arc-shaped guiding surface which is formed from the bottom to the top and bends towards the outer side of sub-bracket; the baffle is located at the bottom between two adjacent sub-brackets, with its fixed end disposed at the bottom of one of the sub-brackets, and its free end located on the other sub-bracket; the free end of the baffle is provided with two counterbores respectively located at the left and right sides of the front portion of the insertion section of one of the sub-bracket, and two through holes corresponding to the two counterbores are respectively formed on the left and right sides of the inserted section of the other sub-bracket; the pivoting shaft sequentially passes through the two through holes and the two counterbores; the spring is disposed between two adjacent sub-brackets, and located at an upper portion of the baffle, and the spring is in the compressed state, while the compression resilience of the spring applies a downwardly curved preload to the outer sub-bracket along the arc-shaped guiding surface formed between two adjacent sub-brackets.

In addition, the main bracket, the first sub-bracket, the second sub-bracket . . . and the N-th sub-bracket form an open downward cavity, and the distance between two adjacent spring positioning parts is smaller than a length of the spring in the uncompressed state.

In addition, the spring positioning part is composed of a positioning column and a positioning cylinder respectively arranged along the longitudinal direction of the brackets at bottoms of two adjacent brackets; one end of the spring is sleeved in the positioning column, and the other end of the spring is sleeved on the positioning cylinder; moreover, the distance between the bottom end surface of the positioning column and the bottom end surface of the positioning cylinder is smaller than the length of the spring in the uncompressed state.

In addition, the main bracket, the first sub-bracket . . . and the N-th sub-bracket are made of plastic material.

In addition, the first sub-brackets can be even numbered, and symmetrically distributed at the front and rear ends of the main bracket.

In addition, the bottom of the main bracket, the first sub-bracket . . . and the N-th sub-bracket are all provided with at least one pair of claws for fixing a wiper strip.

In addition, the free ends of the baffle are provided with a hollow part, the open downward cavity corresponding to the hollow part is provided with a positioning column, and the hollow portion is nested inside the positioning column.

The invention also disclose a new wiper, comprising the wiper bracket as above, a wiper joint for adapting to different types of wiper arms is arranged on the mounting seat in the middle of the wiper bracket, a bottom of the wiper bracket is provided with a plurality of claws, and the wiper strips are fastened on the plurality of claws.

Based on the above scheme of the present invention, the main bracket and the first sub-bracket, and each adjacent two sub-brackets are all connected by a pivot connection with a spring, and at least one baffle is provided at the bottom between two adjacent brackets, so that the spring can apply downwardly curved preload to the outer bracket, and the wiper strip away from the center end of the wiper bracket can also be well fitted to the windshield. Moreover, since the main bracket and each sub-bracket are made of plastic material, the manufacturing cost is low.

BRIEF DESCRIPTION OF THE DRAWINGS

The accompanying drawing, which are included to provide a further understanding of the invention are incorporated in and constitute a part of this specification, illustrate an embodiment of the invention and together with description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments.

The present invention will be described in detail below with reference to the accompanying figures and specific embodiments.

Figure 1:
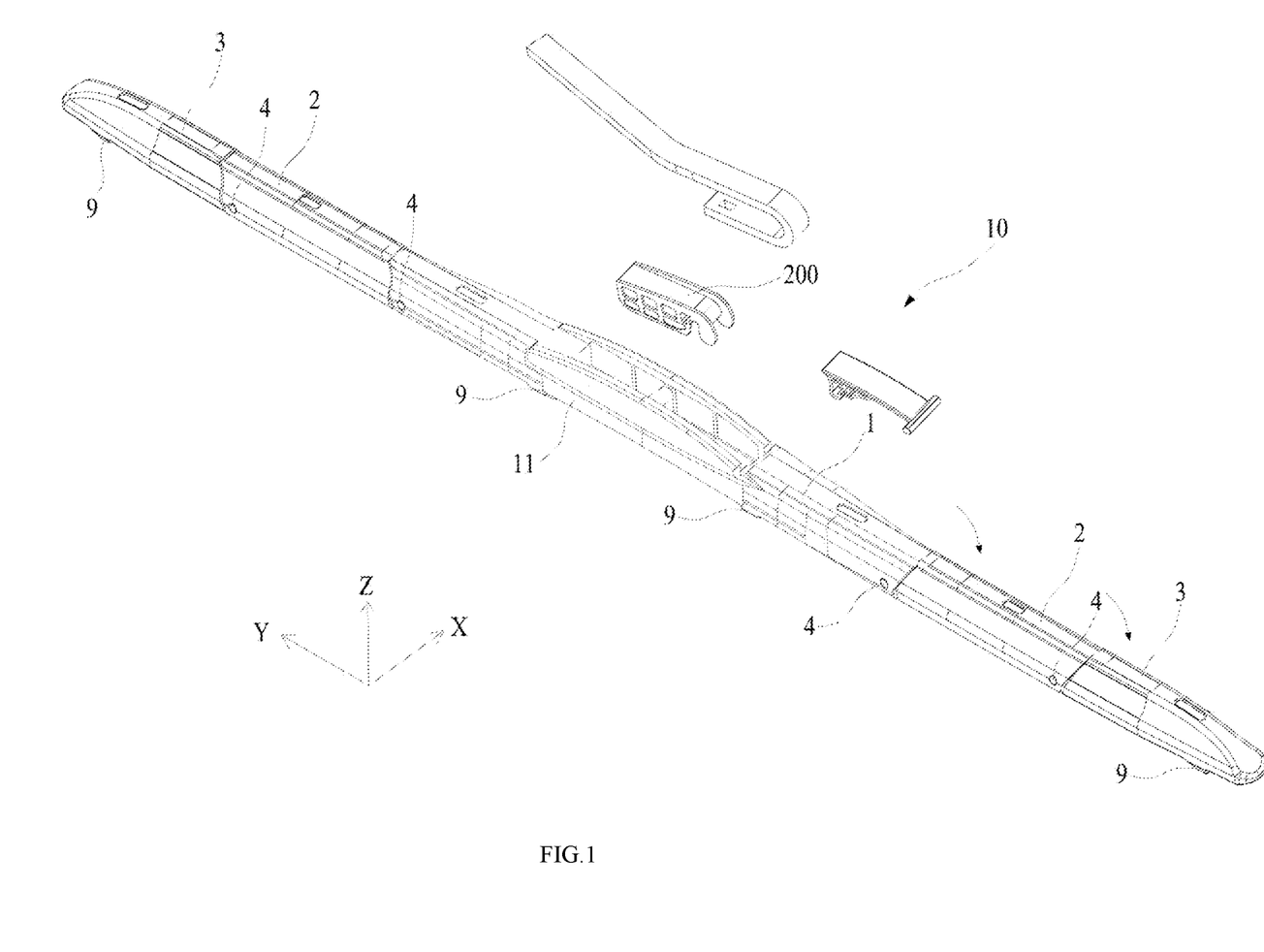
FIG. 1 is a schematic exploded view of a wiper bracket, a wiper arm and a wiper connector of the present invention.
Figure 2:
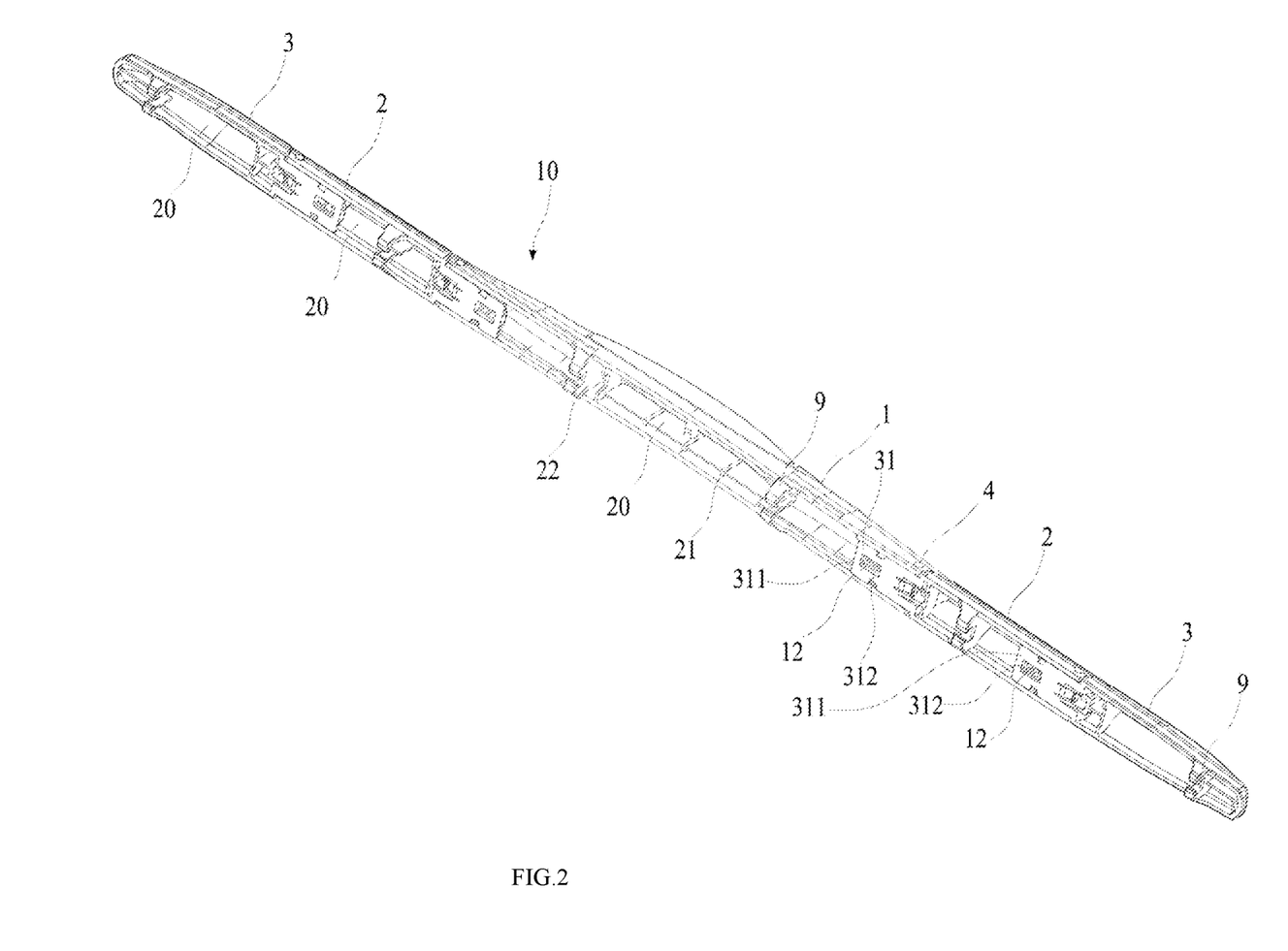
FIG. 2 is a schematic view showing the bottom assembly of a wiper bracket of the present invention.
Figure 3:
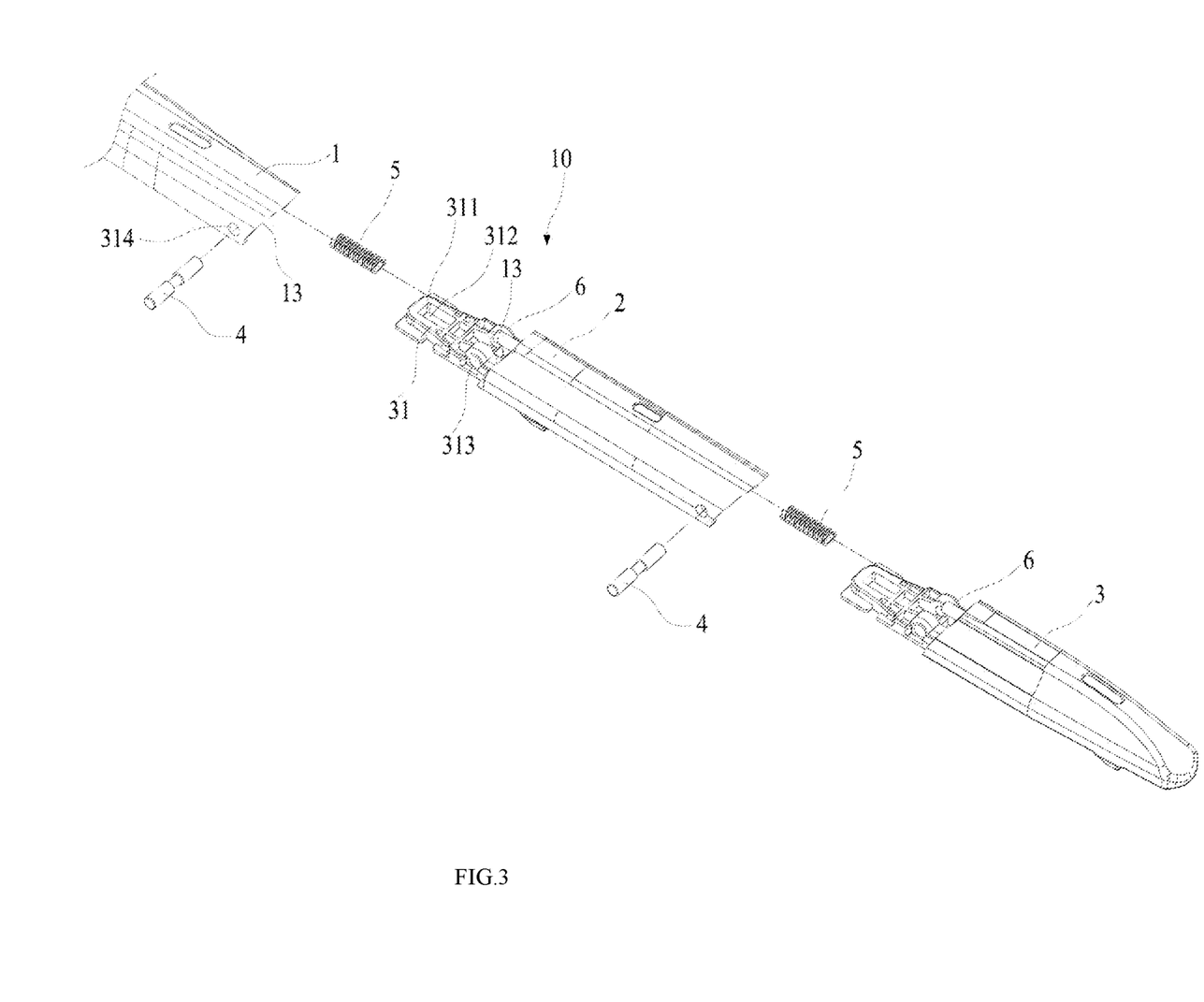
FIG. 3 is a schematic exploded view No. 1 of a wiper bracket of the present invention.
Figure 4:
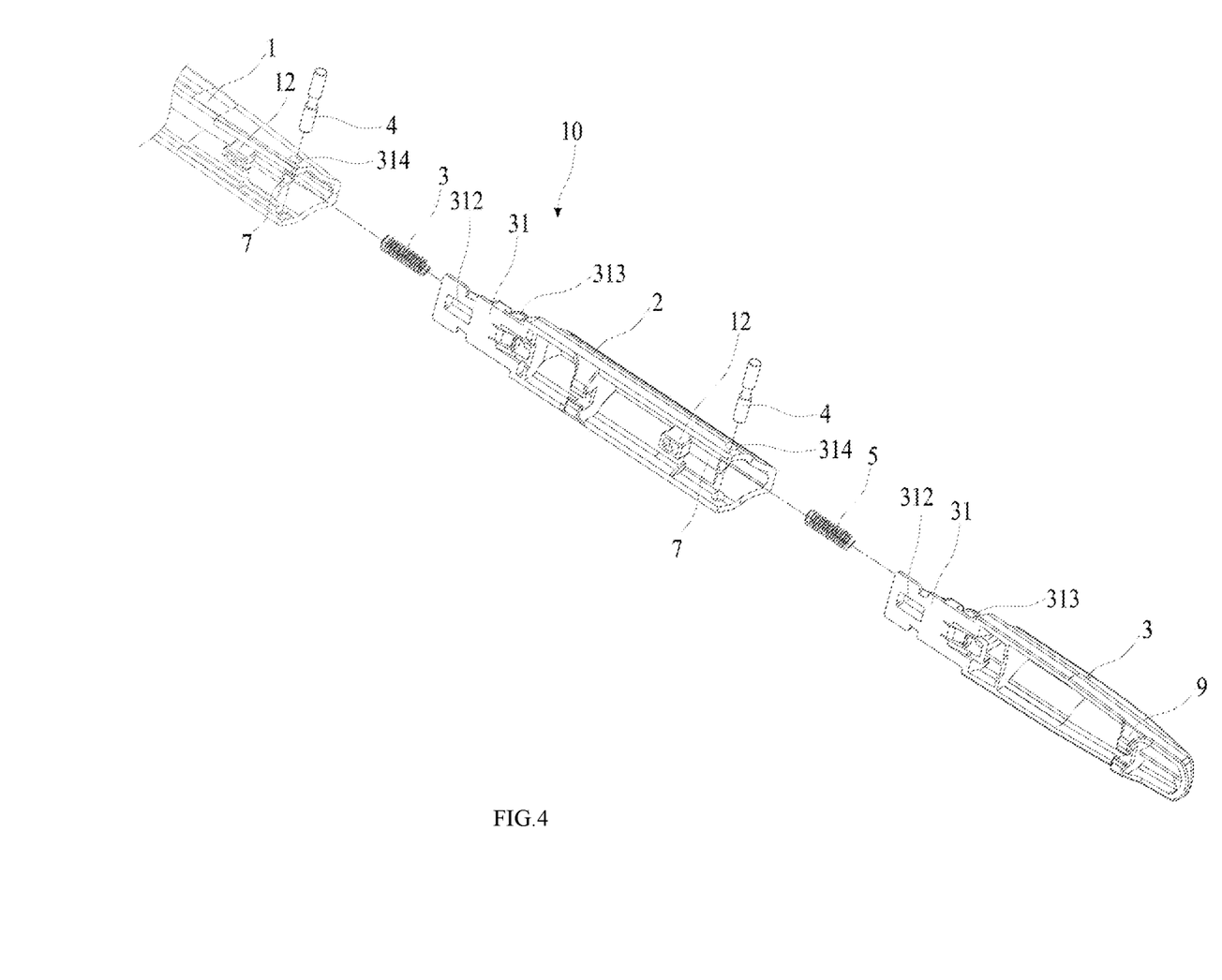
FIG. 4 is a schematic exploded view No. 2 of a wiper bracket of the present invention.
Figure 5:
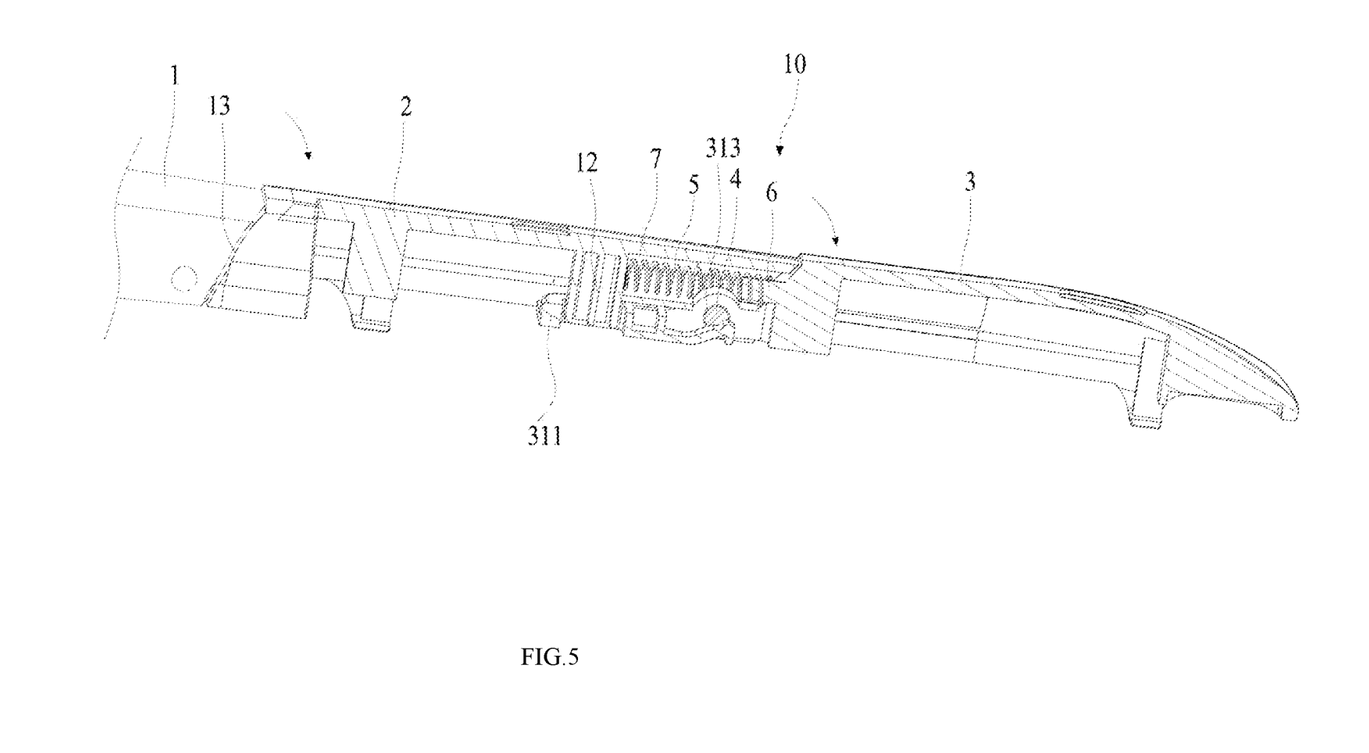
FIG. 5 is a partial cross-sectional view of a wiper bracket of the present invention.
Figure 6:
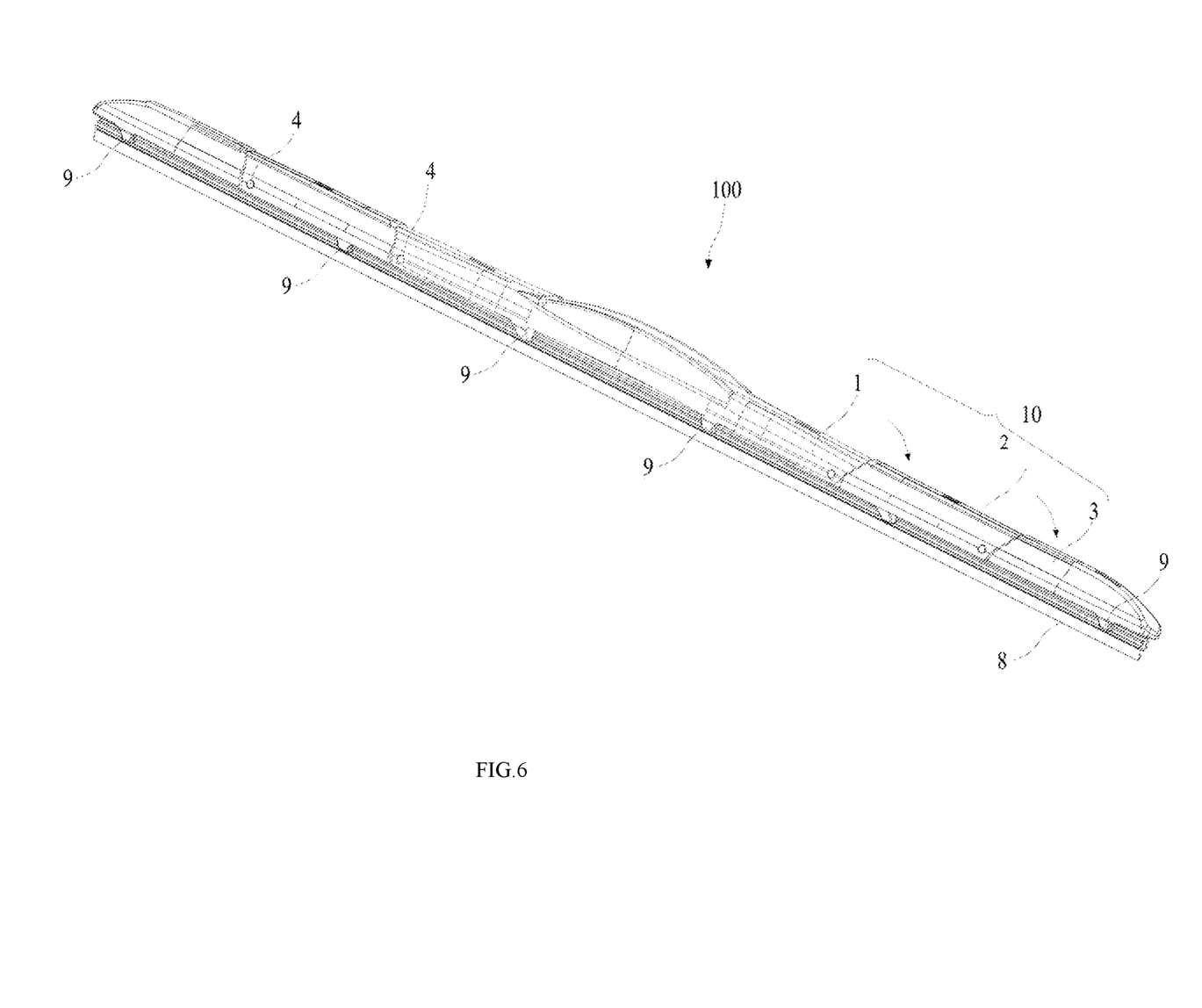
FIG. 6 is a schematic diagram of a combination of a wiper bracket and a wiper strip of the present invention.

For the description of the present invention, the lateral, longitudinal and vertical directions are denoted by X, Y, Z in FIG. 1, without limitation.

As shown in FIG. 1 through FIG. 6, the wiper bracket 10 of the present embodiment includes a main bracket 1, two first sub-brackets 2 are respectively disposed at the front end and the rear end of the main bracket 1, and two second sub-brackets 3 are further respectively disposed on the outer sides of the two first sub-brackets 2. The number of the sub-brackets is flexible according to the length of the wiper bracket. The present invention does not have limitation on the number of the sub-brackets. The main bracket 1, the first sub-bracket 2, the second sub-bracket 3 . . . and the N-th sub-bracket are all provided with an open downward cavity 20, where a plurality of reinforcing ribs 21 or spacers 22 for increasing the strength of the bracket may be disposed in the cavity 20.

The middle of the main bracket 1 is provided with a mounting seat 11 for adapting to different types of wiper joints.

The main bracket 1 and the first sub-bracket 2, and the first sub-bracket 2 and the second sub-bracket 3 are respectively pivotally connected by a connecting device. Here, only the connection structure between the main bracket 1 and the first sub-bracket 2 will be described in detail, and the connection structure between the first sub-bracket 2 and the second sub-bracket 3 . . . the (N−1)-th sub-bracket and the N-th sub-bracket follows analogously. The connecting device contains a baffle 31 at the bottom of the first sub-bracket 2 and the main bracket 1. The specific baffle arrangement manner of this embodiment is as follows: one end of the baffle 31 is fixed to the bottom of the first sub-bracket 2, and the other end of the baffle 31 extends toward the main bracket 1 to form a free end 311, where the free end 311 is inserted into the main bracket 1. Alternatively, the fixed end and the free end of the baffle 31 can also be oppositely disposed, and therefore the position at which the fixed end of the baffle 31 is disposed is not limited by this embodiment. The pivotal connection between the main bracket 1 and the first sub-bracket 2 is specified as follows: the baffle 31 is provided with two counterbores 313 respectively located at the left and right sides of the front end of the insertion section of the bracket (first sub-bracket 2), and two through holes 314 corresponding to the two counterbores 313 are respectively formed on the left and right sides of the inserted section of the other bracket (main bracket 1). The pivoting shaft 4 sequentially passes through the two through holes 314 and the two counterbores 313. The spring 5 is disposed between the main bracket 1 and the first sub-bracket 2, and located at the upper portion of the baffle 31. The spring 5 applies a downwardly curved preload to the first sub-bracket 2, in order to better fix the spring 5 and avoid the upper and lower movement of the spring 5. The bottom of the first sub-bracket 2 and the main bracket 1 are respectively provided with a positioning column 6 and a positioning cylinder 7 along the longitudinal direction of the bracket. One end of the spring 5 is sleeved in the positioning column 6 and the other end of the spring 5 is sleeved on the positioning cylinder 7. The distance between the bottom end surface of the positioning column 6 and the bottom end surface of the positioning cylinder 7 is smaller than the length of the spring 5 in the uncompressed state. In addition, a contact surface of the main bracket 1 and the first sub-bracket 2 contains an arc-shaped guiding surface 13 deflected toward the first sub-bracket 2 from the bottom to the top. By the arrangement of the arc-shaped guiding surface 13, the compression resilience of the spring 5 can better apply downwardly curved preload to the first sub-bracket 2 along the arc-shaped guiding surface 13, which consolidates the fit between the windshield and the wiper strip 8 of the claw 9 in the bottom of the main bracket 1, the first sub-bracket 2 and each other sub-bracket.

Furthermore, the free end 311 of the baffle 31 is provided with a hollow part 312. The open downward cavity 20 corresponding to the hollow part 312 is provided with a positioning column 12, while the hollow portion 312 is just nested inside the positioning column 12. As a result, the baffle 31 is prevented from swaying left and right in the cavity of the inserted section of the bracket. At the same time, the wiper bracket 10 provided by the present invention is provided with plastic components except that the spring 5 is a metal component, which makes the processing cost low.

The present invention also provides a wiper 100 including any of the aforementioned wiper bracket 10. A wiper joint 200 for adapting to different types of wiper arms is arranged on the mounting seat 11 in the middle of the wiper bracket 10 (see FIG. 1). The bottom of the wiper bracket 10 is provided with a plurality of claws 9, and the wiper strips 8 are fixed to the claws 9. The wiper 100 made by using the aforementioned wiper bracket 10 does not need to increase the elastic support piece and other components to ensure the fit between the wiper strip 8 and the windshield of the car, and only needs the pivotal connection between the individual brackets and the preload force generated by the springs located at the bottom of each connection bracket. The wiper 100 can be adaptively fitted to the windshield. Even if the area of the windshield is large, the length of the wiper can be extended by increasing the number of middle sub-brackets. Moreover, because each middle sub-bracket can have uniform specifications, it is only necessary to seal the outer side of the sub-brackets at the front end and the rear end. The above description is only a preferred embodiment of the present invention, and is not a limitation on the design of the present invention. Any equivalent changes made according to the design key of the present invention fall within the scope of protection of the present invention.

What is claimed is:

1. A wiper bracket, comprising:
    a main bracket, wherein a middle portion of the main bracket is provided with a mounting seat for adapting to different types of wiper joints; at least one first sub-bracket, wherein the at least one first sub-bracket is located at a front end or a rear end of the main bracket, and a contact surface of the main bracket and the at least one first sub-bracket contains an arc-shaped guiding surface deflected toward the at least one first sub-bracket from bottom to top; a first connecting device, forming a pivotal connection between the at least one first sub-bracket and the main bracket;
    wherein the first connecting device comprises a first baffle, a first pivoting shaft and a first spring; the first baffle is located at a bottom of the at least one first sub-bracket and a bottom of the main bracket, where one end of the first baffle is a fixed end fixed at the bottom of the main bracket or the bottom of the at least one first sub-bracket, and the other end of the first baffle is a free end located on another bracket opposite to the fixed end of the first baffle;
    when the fixed end of the first baffle is fixed at the bottom of the at least one first sub-bracket, the first baffle is provided with two first counterbores respectively located at a left side and a right side of an insertion section of a front end of the at least one first sub-bracket, and two first through holes corresponding to the two first counterbores are respectively formed on a left side and a right side of an inserted section of the main bracket, the first pivoting shaft sequentially passes through the two first through holes and the two first counterbores;
    or when the fixed end of the first baffle is located at the bottom of the main bracket, two first counterbores are respectively located at a left side and a right side of an insertion section of the front end of the main bracket, and two first through holes corresponding to the two first counterbores are respectively formed on a left side and a right side of an inserted section of the at least one first sub-bracket, the first pivoting shaft sequentially passes through the two first through holes and the two first counterbores;
    wherein the first spring is disposed between the main bracket and the at least one first sub-bracket, and located at an upper portion of the first baffle, and the first spring is in a compressed state, while a compression resilience of the first spring applies a downwardly curved preload to the at least one first sub-bracket along the arc-shaped guiding surface formed between the main bracket and the at least one first sub-bracket.

2. The wiper bracket according to claim 1, wherein the at least one first sub-bracket is further extended with a second sub-bracket, the second sub-bracket is further extended with a third sub-bracket, and similarly a (N−1)-th sub-bracket is further extended with a N-th sub-bracket, N is a positive integer greater than or equal to 2, a N-th connecting device forms a pivotal connection between the (N−1)-th sub-bracket and the N-th sub-bracket, a contact surface of the (N−1)-th sub-bracket and the N-th sub-bracket is provided with a N-th arc-shaped guiding surface deflected toward the N-th sub-bracket from bottom to top;
    wherein the N-th connecting device comprises a N-th baffle, a N-th pivoting shaft and a N-th spring, wherein the N-th baffle is located at a bottom of the (N−1)-th sub-bracket and a bottom of the N-th sub-bracket, and a fixed end of the N-th baffle is disposed at a bottom of the (N−1)-th sub-bracket or a bottom of the N-th sub-bracket, a free end of the N-th baffle is located on another bracket corresponding to the fixed end of the N-th baffle, and when the fixed end of the N-th baffle is fixed at the bottom of the N-th sub-bracket, the free end of the N-th baffle is provided with two N-th counterbores respectively located at a left side and a right side of an insertion section of a front end of the N-th sub-bracket, and two N-th through holes corresponding to the two N-th counterbores are respectively formed on a left side and a right side of an inserted section of the (N−1)-th sub-bracket, the N-th pivoting shaft sequentially passes through the two N-th through holes and the two N-th counterbores; when the fixed end of the N-th baffle is fixed at the bottom of the (N−1)-th sub-bracket, the two N-th counterbores are respectively located at a left side and a right side of an insertion section of a front end of the (N−1)-th sub-bracket, and two 2N-th through holes corresponding to the two N-th counterbores are respectively formed on a left side and a right side of an inserted section of the N-th sub-bracket, the N-th pivoting shaft sequentially passes through the two 2N-th through holes and the two N-th counterbores;
    wherein the N-th spring is disposed between the (N−1)-th sub-bracket and the N-th sub-bracket and located at an upper portion of the N-th baffle, and the N-th spring is in a compressed state, while a compression resilience of the N-th spring applies a downwardly curved preload to an outer sub-bracket along the N-th arc-shaped guiding surface.

3. The wiper bracket according to claim 2, wherein the main bracket, the at least one first sub-bracket, the second sub-bracket and the N-th sub-bracket respectively form an open downward cavity, and a spring positioning part is disposed between two adjacent open downward cavities, and a distance between two adjacent spring positioning parts is smaller than a length of the spring located at the two adjacent spring positioning parts in the uncompressed state.

4. The wiper bracket according to claim 3, wherein the spring positioning part comprises a positioning column and a positioning cylinder respectively arranged along a longitudinal direction of the brackets at bottoms of two adjacent brackets; one end of the spring located at the bottom of two adjacent brackets is sleeved in the positioning column, and the other end of the spring is sleeved on the positioning cylinder; moreover, a distance between a bottom end surface of the positioning column and a bottom end surface of the positioning cylinder is smaller than the length of the spring in the uncompressed state.

5. The wiper bracket according to claim 2, wherein the main bracket, the at least one first sub-bracket and the N-th sub-bracket are made of plastic material.

6. The wiper bracket according to claim 2, wherein the bottom of the main bracket, the at least one first sub-bracket and the N-th sub-bracket are all provided with at least one pair of claws for fixing a wiper strip.

7. The wiper bracket according to claim 2, wherein free ends of the first baffle and the N-th baffle are respectively provided with a hollow part, an open downward cavity corresponding to the hollow part is provided with a positioning convex column, and the hollow part is nested inside the positioning convex column.

8. A wiper, comprising the wiper bracket of claim 1, a wiper joint and a plurality of wiper strips;
wherein the wiper joint for adapting to different types of wiper arms is arranged on the mounting seat in the middle portion of the main bracket, the bottom of the main bracket and the bottom of the at least one first sub-bracket are provided with a plurality of claws, and the wiper strips are fixed to the plurality of claws.

9. The wiper according to claim 8, wherein the at least one first sub-bracket is further extended with a second sub-bracket, the second sub-bracket is further extended with a third sub-bracket, and similarly a (N−1)-th sub-bracket is further extended with a N-th sub-bracket, N is a positive integer greater than or equal to 2, a N-th connecting device forms a pivotal connection between the (N−1)-th sub-bracket and the N-th sub-bracket, a contact surface of the (N−1)-th sub-bracket and the N-th sub-bracket is provided with a N-th arc-shaped guiding surface deflected toward the N-th sub-bracket from bottom to top;
wherein the N-th connecting device comprises a N-th baffle, a N-th pivoting shaft and a N-th spring, wherein the N-th baffle is located at a bottom of the (N−1)-th sub-bracket and a bottom of the N-th sub-bracket, and a fixed end of the N-th baffle is disposed at a bottom of the (N−1)-th sub-bracket or a bottom of the N-th sub-bracket, a free end of the N-th baffle is located on another bracket corresponding to the fixed end of the N-th baffle, and when the fixed end of the N-th baffle is fixed at the bottom of the N-th sub-bracket, the free end of the N-th baffle is provided with two N-th counterbores respectively located at a left side and a right side of an insertion section of a front end of the N-th sub-bracket, and two N-th through holes corresponding to the two N-th counterbores are respectively formed on a left side and a right side of an inserted section of the (N−1)-th sub-bracket, the N-th pivoting shaft sequentially passes through the two N-th through holes and the two N-th counterbores; when the fixed end of the N-th baffle is fixed at the bottom of the (N−1)-th sub-bracket, the two N-th counterbores are respectively located at a left side and a right side of an insertion section of a front end of the (N−1)-th sub-bracket, and two N-th through holes corresponding to the two N-th counterbores are respectively formed on a left side and a right side of an inserted section of the N-th sub-bracket, the N-th pivoting shaft sequentially passes through the two N-th through holes and the two N-th counterbores;
wherein the N-th spring is disposed between the (N−1)-th sub-bracket and the N-th sub-bracket and located at an upper portion of the N-th baffle, and the N-th spring is in a compressed state, while a compression resilience of the N-th spring applies a downwardly curved preload to an outer sub-bracket along the N-th arc-shaped guiding surface.

10. The wiper according to claim 9, wherein the main bracket, the at least one first sub-bracket, the second sub-bracket and the N-th sub-bracket respectively form an open downward cavity, and a spring positioning part is disposed between two adjacent open downward cavities, and a distance between two adjacent spring positioning parts is smaller than a length of the spring located at the two adjacent spring positioning parts in the uncompressed state.

11. The wiper according to claim 10, wherein the spring positioning part comprises a positioning column and a positioning cylinder respectively arranged along a longitudinal direction of the brackets at bottoms of two adjacent brackets; one end of the spring located at the bottom of two adjacent brackets is sleeved in the positioning column, and the other end of the spring is sleeved on the positioning cylinder; moreover, a distance between a bottom end surface of the positioning column and a bottom end surface of the positioning cylinder is smaller than the length of the spring in the uncompressed state.

12. The wiper according to claim 9, wherein the main bracket, the at least one first sub-bracket and the N-th sub-bracket are made of plastic material.

13. The wiper bracket according to claim 9, wherein the bottom of the main bracket, the at least one first sub-bracket and the N-th sub-bracket are all provided with at least one pair of claws for fixing a wiper strip.

14. The wiper bracket according to claim 9, wherein free ends of the first baffle and the N-th baffle are respectively provided with a hollow part, an open downward cavity corresponding to the hollow part is provided with a positioning convex column, and the hollow part is nested inside the positioning convex column.

* * * * *